(12) United States Patent
Sikora et al.

(10) Patent No.: US 10,428,402 B2
(45) Date of Patent: Oct. 1, 2019

(54) METHOD FOR HOT FORMING THIN SEMI-FINISHED PRODUCTS

(71) Applicant: THYSSENKRUPP STEEL EUROPE AG, Duisburg (DE)

(72) Inventors: Sascha Sikora, Lünen (DE); Janko Banik, Altena (DE)

( * ) Notice: Subject to any disclaimer, the term of this patent is extended or adjusted under 35 U.S.C. 154(b) by 936 days.

(21) Appl. No.: 14/894,856

(22) PCT Filed: May 21, 2014

(86) PCT No.: PCT/EP2014/060382
§ 371 (c)(1),
(2) Date: Nov. 30, 2015

(87) PCT Pub. No.: WO2014/191264
PCT Pub. Date: Dec. 4, 2014

(65) Prior Publication Data
US 2017/0073791 A1    Mar. 16, 2017

(30) Foreign Application Priority Data
May 28, 2013  (DE) .......................... 10 2013 105 489

(51) Int. Cl.
*C21D 9/46*        (2006.01)
*C21D 1/18*        (2006.01)
(Continued)

(52) U.S. Cl.
CPC ............. *C21D 9/46* (2013.01); *B21D 22/022* (2013.01); *B21D 28/00* (2013.01); *B21D 47/01* (2013.01);
(Continued)

(58) Field of Classification Search
CPC .................................... C21D 1/18; C21D 9/46
(Continued)

(56) References Cited

U.S. PATENT DOCUMENTS

2003/0000606 A1    1/2003  Muller et al.
2009/0101249 A1    4/2009  Gosmann et al.
(Continued)

FOREIGN PATENT DOCUMENTS

DE    101 20 919 A1    10/2002
DE    101 28 200 A1    12/2002
(Continued)

OTHER PUBLICATIONS

German Language International Search Report for International patent application No. PCT/EP2014/060382; dated Sep. 11, 2014.
(Continued)

*Primary Examiner* — Brian D Walck
(74) *Attorney, Agent, or Firm* — RMCK Law Group PLC

(57) ABSTRACT

The invention relates to a method for hot forming semi-finished products of steel, in which the semi-finished product is heated to the forming temperature, is conveyed to the forming tool, and in the forming tool is hot formed, hardened or press hardened. The object of proposing a method for hot-forming semi-finished products of steel, in which also extremely thin-walled blanks may be conveyed at the forming temperature without issues and be fed to the forming tool properly and without limiting the degree of forming of the semi-finished product, is achieved in that prior to hot forming, hardening or press hardening, at least one structure which increases rigidity at least is incorporated in the semi-finished product, and the structure which increases rigidity of the semi-finished product is at least partially or completely disposed in the trimming region of the semi-finished product.

12 Claims, 2 Drawing Sheets

(51) Int. Cl.
- *C21D 1/673* (2006.01)
- *B21D 28/00* (2006.01)
- *B21D 47/01* (2006.01)
- *B21D 53/88* (2006.01)
- *B62D 25/04* (2006.01)
- *B21D 22/02* (2006.01)
- *B62D 29/00* (2006.01)
- *C21D 8/02* (2006.01)

(52) U.S. Cl.
CPC ............ *B21D 53/88* (2013.01); *B62D 25/04* (2013.01); *B62D 29/007* (2013.01); *C21D 1/18* (2013.01); *C21D 1/673* (2013.01); *C21D 8/0205* (2013.01); *C21D 2221/01* (2013.01); *C21D 2261/00* (2013.01)

(58) Field of Classification Search
USPC .................................................. 148/648, 653
See application file for complete search history.

(56) References Cited

U.S. PATENT DOCUMENTS

2011/0283874 A1* 11/2011 Klasfauseweh ........... F41H 7/04
 89/36.02
2012/0210764 A1 8/2012 Moore

FOREIGN PATENT DOCUMENTS

| DE | 10 2007 050 907 A1 | 4/2009 |
| EP | 2 457 673 A1 | 5/2012 |
| JP | 2003 053445 A | 2/2003 |
| JP | 2007 190570 A | 8/2007 |
| WO | 2011/050443 A1 | 5/2011 |

OTHER PUBLICATIONS

English translation of International Search Report for International patent application No. PCT/EP2014/060382; dated Sep. 11, 2014.
English translation of the abstract of JP 2007 190570 A.
English translation of the abstract of JP 2003 053445 A.
English translation of the abstract of EP 2 457 673 A1.
English translation of the abstract of DE 101 20 919 A1.

* cited by examiner

METHOD FOR HOT FORMING THIN SEMI-FINISHED PRODUCTS

CROSS REFERENCE TO RELATED APPLICATIONS

This application is a U.S. National Stage Entry of International Patent Application Serial Number PCT/EP2014/060382, filed May 21, 2014, which claims priority to German Patent Application No. DE 102013105489.7 filed May 28, 2013, the entire contents of both of which are incorporated herein by reference.

FIELD

The present disclosure relates to methods for hot forming thin semi-finished products.

BACKGROUND

By way of the employment of hardenable steel varieties, the wall thicknesses of the sheets used may be further reduced in order for specific and desired strengths to be achieved, such that potentials for saving weight are opened up, for example, in the automotive industry. In hot forming, the semi-finished products, for examples cut-to-size blanks and sheets are heated to temperatures above the $AC_1$ temperature point and fed to the forming tool. However, on account of the high forming temperature, the inherent rigidity of the blank is reduced in such a manner that bending arises in particular in the case of minor wall thicknesses and large-area semi-finished products or blanks, respectively, potentially leading to issues during conveying of the blanks. This may lead to significant losses in production in particular in the case of automated conveying, when said blanks seize due to bending during conveying. Various solutions addressing this problem are known from the prior art. It is thus known from the European patent application EP 2 457 673 A1 for a rigidity-increasing structure to be incorporated into the blank by hot stamping. However, the differentials in wall thickness which result therefrom also lead to the creation of regions having a more strongly reduced wall thickness, such that additional issues in terms of unwanted bending in the regions having a particularly minor wall thickness arise. Attempting to introduce a structure into the sheet without modifying the wall thickness does indeed lead to the problem in terms of regions having a reduced wall thickness being solved. However, it has proven to be altogether disadvantageous for the subsequent hot-forming process that the incorporated structures have to be deformed or flattened again during hot forming. On account thereof, the forming behavior deteriorates and the degrees of forming which are possible are reduced. The German laid open publication DE 101 28 200 A1 for example discloses an incorporation of pleats which are oriented in the direction of conveying and which serve as a bearing surface of the blank during conveying of the latter, on the one hand, and are conjointly formed during hot forming, on the other hand. Here too, it is the intention that the pleats once they have been incorporated are flattened in the pressing tool which is considered to be altogether disadvantageous for the subsequent forming of the blank.

DETAILED DESCRIPTION

Figure 1:
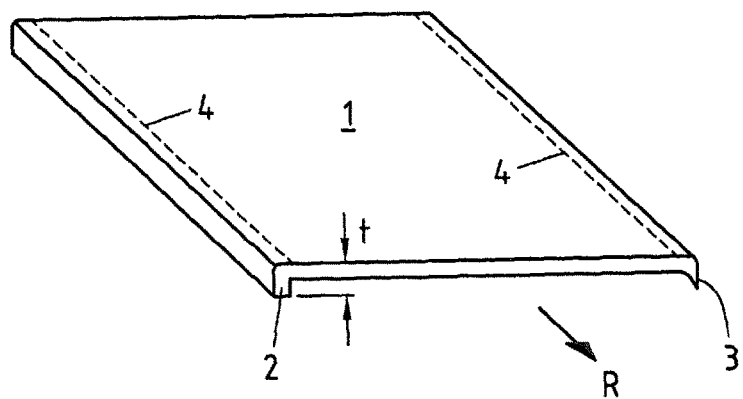
FIG. 1 is perspective view of an example semi-finished product having an example chamfer and an example cutting burr in a trimming region.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure relates generally to methods for hot forming semi-finished products of steel. In one example, a semi-finished product may be heated to a forming temperature and then conveyed to a forming tool where the semi-finished product may be hot formed, hardened, or press hardened.

Furthermore, the present invention is based on the object of proposing a method for hot forming semi-finished products of steel, in which also extremely thin-walled blanks may be conveyed at the forming temperature without issues and be fed to the forming tool properly and without limiting the degree of forming of the semi-finished product.

According to a first teaching of the present invention, the above-described object is achieved by a method in that prior to hot forming or press hardening, at least one structure which increases rigidity is incorporated in the semi-finished product, and the structure which increases rigidity of the semi-finished product is at least partially or completely disposed in the trimming region of the semi-finished product.

On account of the fact that the structure which increases rigidity of the semi-finished product is at least partially disposed in the trimming region of the blank, this structure no longer has to be completely flattened or deformed during the hot-forming process. The forming process of the semi-finished product therefore takes place in a manner which is almost unhindered by the structure which increases rigidity of the semi-finished product. However, this structure has the effect that the semi-finished product may also be conveyed by way of transfer devices also from a furnace, for example, at the forming temperature to the forming tool without issues at the forming temperature, at which the inherent rigidity of the semi-finished product is reduced. The rigidity of the semi-finished product in the presence of the rigidity-increasing structure and of thin wall thicknesses is sufficient to preclude bending which may lead to faults or losses in production. The structures which increase rigidity of the semi-finished product are particularly preferably completely disposed in the trimming region of the semi-finished product, such that no part of the mentioned structures may influence the forming process, either. In particular, no remnants of the structure remain on the finished, formed, and trimmed steel part.

The method is particularly advantageous when a semi-finished product having a wall thickness of maximum 1.2 mm, maximum 1.0 mm, maximum 0.8 mm, or maximum 0.5 mm is formed. It has emerged that conveying of the semi-finished products which are heated to the forming temperature is specifically problematic in the case of these wall thicknesses.

According to a next design embodiment of the method, at least one depression and/or at least one pleat are incorporated in the semi-finished product as rigidity-increasing structure. Depressions and/or pleats are particularly simple measures for increasing rigidity of the semi-finished product to be formed. The pleats and the depressions preferably run in the direction of conveying, such that conveying via a roller system, for example, may be carried out with as little contact as possible between the semi-finished product and the rollers.

A further measure for increasing rigidity of the semi-finished product is achieved in that at least one chamfer of an edge of the semi-finished product is incorporated as rigidity-increasing structures. These chamfers which are provided on the outside on the edges of a cut-to-size blank, for example, in the case of a chamfer at an angle of 90°, for example, lead to a particularly high increase in rigidity, since rigidity of the semi-finished product is then determined by the depth of the chamfer. An enormous increase of rigidity is already implemented at minor depths of such chamfers.

If, according to a further embodiment, a large cutting burr on cutting edges of the semi-finished product or a bent portion of the cutting edge due to retraction during the cutting of the blank is incorporated as a rigidity-increasing structure, a structure which increases rigidity of the semi-finished product may be incorporated in one operational step while the semi-finished product is being cut-to-size.

As a further advantageous embodiment of the method, a beading of the periphery of the semi-finished product may be incorporated in the semi-finished product as a rigidity-increasing structure. Despite the high strength of the materials used, beadings may also be incorporated directly in the strip prior to the latter being cut-to-size, for example, to form sheets, wherein using a roll forming method, for example. Here, a unilateral beading may already suffice in order for rigidity to be increased to a sufficient extent. Preferably, however, beadings are provided on two opposite edges of a cut-to-size blank.

As a further embodiment, a stamping is incorporated in the semi-finished product as a rigidity-increasing structure, which stamping, as already presented above, is provided substantially in the trimming region of the semi-finished product. On account of the larger wall thickness in these regions, the stamping leads to higher rigidity of the semi-finished product, so that conveying of the semi-finished product may also be performed without issues at high forming temperatures and minor wall thicknesses of maximum 1.2 mm, for example.

According to a further embodiment of the method, the rigidity-increasing structure immediately after or during hot forming or press hardening is at least partially removed by trimming. On account thereof, it is ensured that a finished component may be provided immediately after hot forming or press hardening, respectively, without the structures which increase rigidity limiting the degrees of forming during hot forming or press hardening, respectively.

Cut-to-size and planar blanks are used as particularly simple semi-finished products. As has already been mentioned, while the blank is being cut to size, the structures which increase rigidity may be incorporated in the semi-finished product in a simple manner by way of an enlarged cutting burr or by a bent portion as a result of the cutting of the blank, for example.

Finally, using the method according to a further embodiment, the semi-finished product is formed into a vehicle component, in particular a part of an A-pillar, a B-pillar, or a C-pillar of a motor vehicle. It has emerged that specifically in the manufacture of vehicle components at least two conditions which render the use of the method according to the invention particularly advantageous are fulfilled. On the one hand, the vehicle components have a wall thickness that is as small as possible, so as to provide low weight. Therefore, thin blanks of hardenable steel varieties, for example, having a wall thickness of maximum 1.2 mm, maximum 1.0 mm, maximum 0.8 mm, or maximum 0.5 mm are typically used. On the other hand, sheet parts having a particularly large area are required, for example, for providing sheets for the bodywork, so that the semi-finished products have correspondingly large dimensions and are prone to bending.

FIG. 1, in a perspective and schematic illustration, shows an exemplary embodiment of a semi-finished product 1 in the form of a blank which on the left side has a chamfer 2 and on the right side has a large cutting burr 3 for increasing rigidity. However, structures of an identical type for enhancing rigidity may be incorporated on both edges of the semi-finished product 1 illustrated. The trimming region of the plate 1 is illustrated using the dashed line 4. As may be readily seen, rigidity of the blank 1 is determined by the depth of the chamfer t, or the depth of the cutting burr 3, respectively, since the cutting burr 3 or the chamfer 2, respectively, also has to be bend in the case of bending which is perpendicular to the chamfer or the cutting burr, respectively. In this way, bending of the semi-finished product which is perpendicular to the chamfer or perpendicular to the cutting burr, respectively, is prevented in a simple manner. Not only the disposal of a chamfer 2 or of the cutting burr 3 in the direction of conveying R, but also so as to be perpendicular thereto, for example, is also conceivable. However, an exemplary embodiment corresponding thereto is not illustrated.

Figure 2:
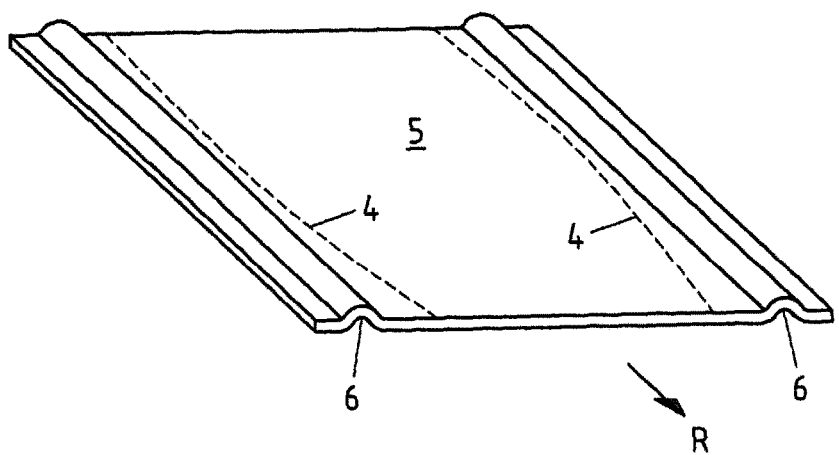
FIG. 2 is a perspective view of an example semi-finished product having example pleats in a trimming region.

The cutting line 4 indicates the trimming region of the blank. Post forming, the rigidity-increasing structure 2, 3 is completely removed from the formed blank. In this way, it is also not necessary for corresponding regions or the entire rigidity-increasing structure to be deformed or to be re-flattened during the hot-forming process. The same also applies to the pleats 6 of the semi-finished product 5 of FIG. 2, which run in the direction of conveying R. As can be seen, the cutting lines 4 here also run in such a manner that the rigidity-increasing structures, here the pleats 6, are completely located in the trimming region. However, it is also conceivable for the finished component to have a corresponding region with a pleat 6, such that the rigidity-increasing structures 2, 3, 6 only have to be partially removed.

Figure 3:
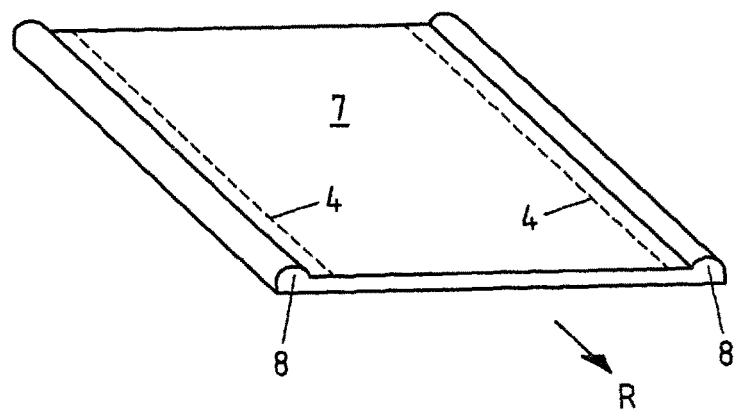
FIG. 3 is a perspective view of an example semi-finished product having example stampings with increased wall thickness in a trimming region.

A measure which is similar to incorporating a pleat 6, a chamfer 2, or a large cutting burr 3, respectively, is achieved by a stamping 8 in the trimming region, as is shown by the blank 7 in FIG. 3. Here too, the cutting lines 4 mark the trimming region, on account of which it becomes clear that the stampings 8 which are provided with a greater wall thickness are disposed in the trimming region and thus post forming and trimming are no longer part of the formed component.

Figure 4:
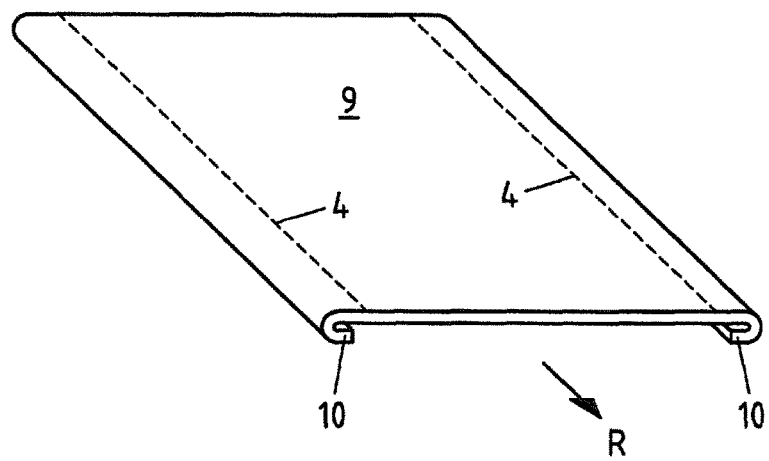
FIG. 4 is a perspective view of an example semi-finished product having example beadings in a trimming region.

The same also applies to the beading 10 which in the exemplary embodiment illustrated in FIG. 4 have been incorporated on the periphery of the cut-to-size blank 9. As is also the case in the remaining exemplary embodiments above, the cutting lines 4 are illustrated using dashed lines, such that the beading 10 are located in the trimming region of the blank 9. Beadings 10 may be incorporated in a simple manner in a strip, for example by way of a roll forming method.

Figures 5, 6:
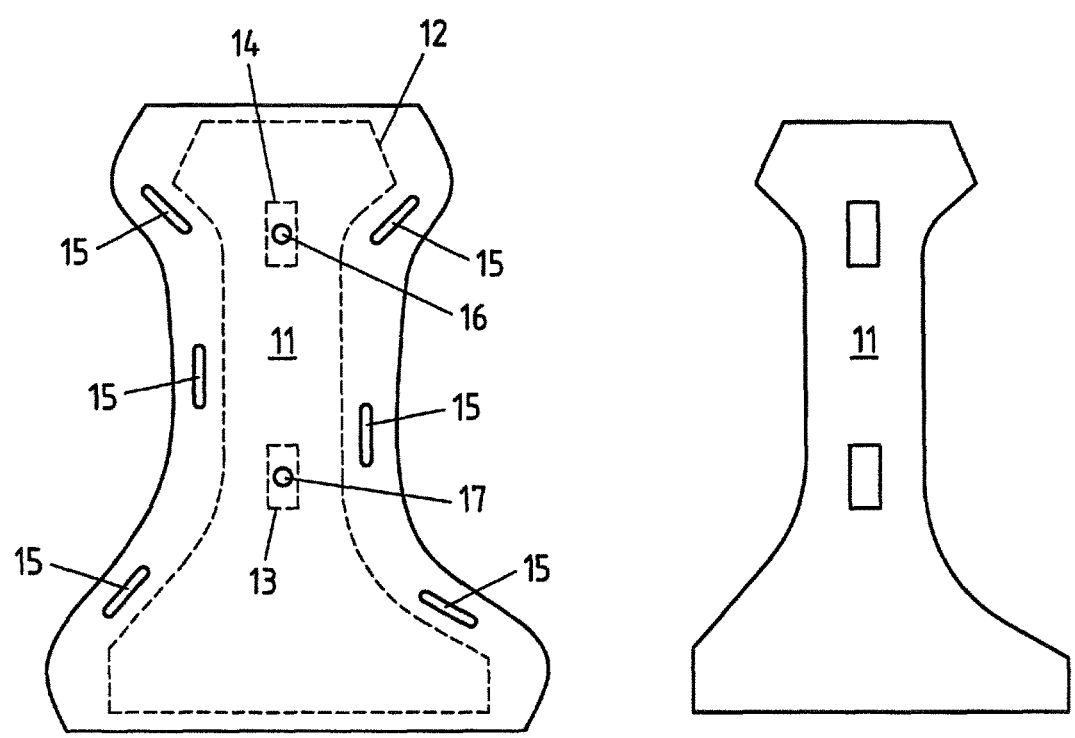
FIG. 5 is a plan view of an example semi-finished product having example pleats and elevated cutting burrs in a trimming region.
FIG. 6 is a plan view of the example semi-finished product of FIG. 5 after trimming.

The exemplary embodiment of FIG. 5 is a plan view of a semi-finished product which is to be formed into a vehicle component, in the present exemplary embodiment into a part of a B-pillar of a motor vehicle. The semi-finished product 11 has a plurality of trimming regions which are defined by the lines 12, 13, 14. Pleats 15, on the one hand, and an elevated cutting burr 16 and 17, on the other hand, are provided in the trimming region. These serve for stiffening the blank 11, until being removed during trimming of the hot-formed, hardened, or press-hardened semi-finished product 11. A plan view of the formed semi-finished product 11 post trimming is illustrated in FIG. 6. The blank 11 has been formed into a part of a B-pillar of a motor vehicle. This also represents a typical application for hot-formed sheets, since particularly high strengths and at the same time low weights are required here. It is also conceivable for the semi-finished product 11 to be formed into parts of an A-pillar or a C-pillar of a motor vehicle or into another vehicle component, and then for the structures which increase rigidity of the semi-finished product to be at least partially removed from the semi-finished product by trimming.

Therefore, semi-finished products having a particularly large area and very thin wall thicknesses of maximum 1.2 mm, maximum 1.0 mm, maximum 0.8 mm, or maximum 0.5 mm may in particular be hot formed, hardened or press hardened, using the method according to the invention, without process-related issues arising on account of undesirable bending of the semi-finished products which have been heated to the forming temperature.

What is claimed is:

1. A method for hot forming a semi-finished product of steel, the method comprising:
   heating the semi-finished product to a forming temperature;
   conveying the semi-finished product to a forming tool;
   forming at least one structure in the semi-finished product that increases rigidity of the semi-finished product, the at least one structure being formed at least partially in a trimming region of the semi-finished product, the trimming region defined as a portion of the semi-finished product that is removed resulting from cutting along a cutting line on the semi-finished product;
   hot forming, hardening, or press hardening the semi-finished product in the forming tool after the at least one structure has been formed in the semi-finished product;
   removing the trimming region from the semi-finished product thereby removing the structure wherein no remnants of the at least one structure remain on the semi-finished, formed and trimmed semi-finished product of steel; and
   forming the semi-finished product into an A-pillar, a B-pillar, or a C-pillar of a motor vehicle.

2. The method of claim 1 wherein the at least one structure comprises a depression.

3. The method of claim 1 wherein the at least one structure comprises a pleat.

4. The method of claim 1 wherein the at least one structure comprises at least one cutting burr on a cutting edge of the semi-finished product.

5. The method of claim 1 wherein the at least one structure comprises at least one beading on a periphery of the semi-finished product.

6. The method of claim 1 wherein the at least one structure comprises at least one stamping.

7. A method for hot forming a semi-finished product of steel, the method comprising:
   heating the semi-finished product to a forming temperature;
   conveying the semi-finished product to a forming tool;
   identifying a cutting line on the semi-finished product that indicates a division between a trimming region and a formed blank, the trimming region defined as a portion of the semi-finished product that is removed from the semi-finished product leaving the formed blank;
   forming at least one structure in the semi-finished product that increases rigidity of the semi-finished product, the at least one structure being formed at least partially in the trimming region of the semi-finished product;
   hot forming, hardening, or press hardening the semi-finished product in the forming tool after the at least one structure has been formed in the semi-finished product;
   removing the trimming region from the semi-finished product wherein no remnants of the at least one structure remain on the semi-finished, formed and trimmed semi-finished product of steel; and
   forming the semi-finished product into an A-pillar, a B-pillar, or a C-pillar of a motor vehicle.

8. The method of claim 7 wherein the at least one structure comprises a depression.

9. The method of claim 7 wherein the at least one structure comprises a pleat.

10. The method of claim 7 wherein the at least one structure comprises at least one cutting burr on a cutting edge of the semi-finished product.

11. The method of claim 7 wherein the at least one structure comprises at least one beading on a periphery of the semi-finished product.

12. The method of claim 7 wherein the at least one structure comprises at least one stamping.

* * * * *